United States Patent
Paik

(10) Patent No.: US 9,171,544 B2
(45) Date of Patent: Oct. 27, 2015

(54) SYSTEM FOR PROVIDING A SOUND SOURCE INFORMATION MANAGEMENT SERVICE

(75) Inventor: Soon Kwon Paik, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 427 days.

(21) Appl. No.: 13/556,734

(22) Filed: Jul. 24, 2012

(65) Prior Publication Data

US 2013/0096925 A1 Apr. 18, 2013

(30) Foreign Application Priority Data

Oct. 13, 2011 (KR) .......................... 10-2011-0104804

(51) Int. Cl.
- G10L 21/00 (2013.01)
- G10L 15/22 (2006.01)
- G06F 17/30 (2006.01)
- G10L 15/30 (2013.01)

(52) U.S. Cl.
CPC .......... *G10L 15/22* (2013.01); *G06F 17/30053* (2013.01); *G06F 17/30755* (2013.01); *G06F 17/30769* (2013.01); *G06F 17/30772* (2013.01); *G10L 15/30* (2013.01); *G10L 2015/221* (2013.01)

(58) Field of Classification Search
CPC ....... G10L 15/265; G10L 15/22; G10L 15/30; G10L 15/00; G10L 17/02; G10L 17/04; G10L 17/06; G10L 17/24
USPC .......................... 704/246, 247, 251, 252, 275
See application file for complete search history.

(56) References Cited

U.S. PATENT DOCUMENTS

| | | | | |
|---|---|---|---|---|
| 7,461,122 | B2 * | 12/2008 | Kawana | 709/203 |
| 8,509,397 | B2 * | 8/2013 | Chen et al. | 379/88.1 |
| 2004/0194611 | A1 * | 10/2004 | Kawana | 84/600 |
| 2012/0064870 | A1 * | 3/2012 | Chen et al. | 455/414.3 |

FOREIGN PATENT DOCUMENTS

| | | |
|---|---|---|
| JP | 06-089483 | 3/1994 |
| JP | 11242496 A | 9/1999 |
| JP | 2000268545 A | 9/2000 |
| KR | 10-2001-0011985 | 2/2001 |
| KR | 10-2001-0037652 | 5/2001 |
| KR | 10-2001-0099450 | 11/2001 |
| KR | 10-2002-0015123 | 2/2002 |
| KR | 10-2004-0062317 | 7/2004 |
| KR | 1020060083245 A | 7/2006 |
| KR | 10-2007-0048922 A | 5/2007 |
| KR | 10-2008-0000203 | 1/2008 |
| KR | 10-2010-0064136 | 6/2010 |
| KR | 10-2011-0054946 A | 5/2011 |
| WO | 2006/075887 A1 | 7/2006 |

* cited by examiner

*Primary Examiner* — Leonard Saint Cyr
(74) *Attorney, Agent, or Firm* — Mintz Levin Cohn Ferris Glovsky and Popeo, P.C.; Peter F. Corless

(57) ABSTRACT

Disclosed is a system for providing a sound source information management service. The system for providing a sound source information management service manages sound source information transmitted from a driver terminal and extracts the sound source information corresponding to voice input data via voice recognition according to the voice input data transmitted from the driver terminal and provides the extracted sound source information to the driver terminal.

11 Claims, 6 Drawing Sheets

SYSTEM FOR PROVIDING A SOUND SOURCE INFORMATION MANAGEMENT SERVICE

CROSS-REFERENCES TO RELATED APPLICATIONS

Priority to Korean patent application number 10-2011-0104804, filed on Oct. 13, 2011, which is incorporated by reference in its entirety, is claimed.

FIELD OF THE INVENTION

The present invention relates to a technique for providing a sound source information management service, and more particularly, to a system for providing a sound source information management service that provides a playlist for the corresponding sound source by recognizing driver's voice.

BACKGROUND OF THE INVENTION

Audio systems mounted in a vehicle typically include an AM/FM radio receiver, a compact disk player, an MPET-1 Audio Layer 3 (MP3) player, etc. For many years compact disk (CD) players were the main audio source for many consumers in a vehicle. A CD about 75-80 minutes of data capacity may store about 20 songs. Many CDs which are formatted to play music are formatted in a Waveform Audio File (WAV) Format. WAV files, however, typically are not able to provide sound source information as well to the CD player. That is, WAV files don't usually have information fields, for instance, in the case of a song, title, artist, album, year, etc.

MP3 CD players have been mainly used to play digital audio. A CD in MP3 format with 700M capacity may store typically about 100 songs although the song count can change depending on the file size of each individual song and the quality of the audio. MP3 files, however, are able to include sound source information called ID3 tags which unlike WAV files is able to provide data along with the audio to the player. The MP3 file may also be stored in a portable storage device (e.g., a USB memory, memory card, or the like), which may be connected with an audio system to provide the MP3 file to the audio system upon request by the user.

However, in both WAV and MP3 formats there are currently no techniques or devices for automatically creating a playlist from the CD or the portable storage device storing a large number of sound sources. For example, when a driver is utilizing a conventional voice recognition system in a vehicle, and voice inputs the phrase "Michael Jackson," the systems currently available would not be able to retrieve and organize a playlist, containing only "Michael Jackson" songs, automatically from a CD and/or a portable storage device.

SUMMARY OF THE INVENTION

The present invention provides a sound source information management service that manages sound source information transmitted from a driver terminal, receives voice input data from the driver terminal and extracts sound source information corresponding to the voice input data input via a voice recognition system, and provides the extracted sound source information to the driver terminal.

Furthermore, the present invention provides a system for providing a sound source information management service by acquiring and managing sound source information corresponding to a sound source in question transmitted from a driver terminal, receiving voice input data from the driver terminal and extracting sound source information corresponding to the voice input data by a voice recognition system, and providing the extracted sound source information to the driver terminal.

According to an exemplary embodiment of the present invention, a driver terminal includes a sound source storage unit that is configured to store a sound source having sound source information, a voice input unit configured to receive voice input data from a driver, a wireless communication unit configured to transmit the voice input data to a management server and receive a playlist corresponding to the voice input data from the management server, a display unit configured to display the playlist transmitted to the wireless communication unit on a screen, and a control unit configured to control the voice input unit to receive the voice input data from the driver when a song selection mode has been activated by the driver, control the wireless communication unit to transmit the voice input data through the voce input unit to the management server, and control the display unit to display the playlist transmitted through the wireless communication unit on the screen.

According to another exemplary embodiment of the present invention, a management server of a system for providing a sound source information management service is provided. The management server includes a storage unit configured to store sound source information regarding each sound source; a wireless communication unit configured to receive voice input data for selecting a song from a driver terminal and transmitting a playlist corresponding to the received voice input data to the driver terminal; a voice recognition unit configured to recognize the voice input data transmitted to the wireless communication unit; and a control unit configured to control the voice recognition unit to identify/recognize the voice input data transmitted from the driver terminal, extract the corresponding sound source information from the storage unit based on results recognized by the voice recognition unit to create a playlist, and control the wireless communication unit to transmit the created playlist to the driver terminal.

According to another exemplary embodiment of the present invention, a management server of a system for providing a sound source information management service. The management server includes a wireless communication unit configured to receive voice input data that selects a sound source and a song from a driver terminal and transmits a playlist corresponding to the received voice input data to the driver terminal; an interworking unit configured to access an external sound source sever to share a sound source database; a voice recognition unit configured to recognize the voice input data transmitted to the wireless communication unit; a storage unit configured to store sound source information related a sound source transmitted to the wireless communication unit; and a control unit configured to acquire the sound source information related the sound source from the sound source database and store the acquired sound source information in the storage unit, control the voice recognition unit to recognize the voice input data transmitted from the driver terminal, extract the corresponding sound source information based on results recognized by the voice recognition unit to create a playlist, and control the wireless communication unit to transmit the created playlist to the driver terminal.

According to another exemplary embodiment of the present invention, a method for providing a sound source information management service in a driver terminal is provided. The method includes storing, by a sound source storage unit, a sound source having sound source information;

receiving, by a voice input unit, voice input data from a driver in response to the driver activating a song selection mode; transmitting, by a wireless communication unit, the received voice input data to a management server; and displaying, by a display unit, a playlist transmitted from the management server on a screen.

According to another exemplary embodiment of the present invention, a method for providing a sound source information management service in a management server is provided. The method includes storing, by a storage unit, sound source information related to each sound source within the storage unit; receiving, by a wireless communication unit, voice input data from a driver terminal; recognizing, by a voice recognition unit, the received voice input data; extracting, by a control unit, the corresponding specific sound source information from the received sound source information based on results recognized by the voice recognition unit to create a playlist; and transmitting, by the wireless communication unit, the playlist to the driver terminal.

According to another exemplary embodiment of the present invention, a method for providing a sound source information management service in a management server is provided. The method includes receiving, by a wireless communication unit, a sound source from a driver terminal; acquiring and storing, by a control unit, sound source information corresponding to the sound source from an external sound source database; receiving, by the wireless communication unit, voice input data from the driver terminal; recognizing, by a voice recognition unit, the voice input data; extracting, by the control unit, the corresponding sound source information from the storage unit based on results recognized by the voice recognition unit to create a playlist; and transmitting, by the wireless communication unit, the playlist to the driver terminal.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

In the present invention, the sound source refers sound source data such as audio files or the like and the sound source information refers to information such as for example, a title of a song, a name of a signer, or the like within the sound source data.

Figure 1:
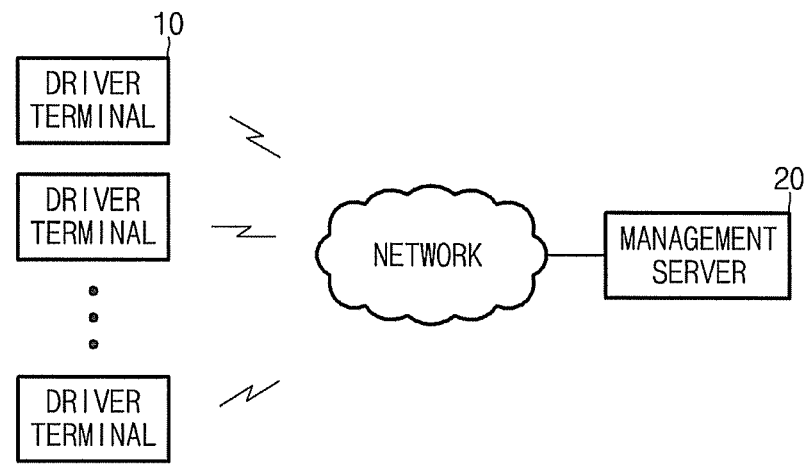
FIG. 1 is a schematic diagram of a system for providing a sound source information management service according to an exemplary embodiment of the present invention.

FIG. 1 is a schematic diagram of a system for providing a sound source information management service according to an exemplary embodiment of the present invention. As shown in FIG. 1, a system for providing a sound source information management service according to an exemplary embodiment of the present invention includes at least one driver terminal 10 and a management server 20. Describing each component, the driver terminal 10 is mounted within a vehicle and is in wireless communication with a management server 20. The driver terminals 10 are a multimedia devices within a vehicle which include, for example, a function of playing various sound sources, a navigation function, a multimedia function, or the like.

When power is applied to the driver terminal 10, the driver terminal 10 transmits sound source information corresponding to a sound source stored in a sound source storage unit 11 to the management server 20. In this case, the sound source storage unit 11 may be a CD and a portable storage device.

When the sound source storage unit 11 is a CD, the driver terminal 10 may transmit the sound source information corresponding to the sound source stored in the CD to the management server 20 when the CD is inserted into the driver terminal 10. When the sound source storage unit 11 is the portable storage device, the sound source information corresponding to the sound source stored in the portable storage device may be transmitted to the management server 20 when the portable storage device is connected with the driver terminal 10.

The management server 20 includes the voice recognition function and manages the sound source information transmitted from the driver terminal 10 and extracts the sound source information based on voice input data from the driver via voice recognition when the management server 20 receives voice input data related to the sound source information. For example, the voice input data may be related to a title of a song, a name of a signer, and the like. This voice input data is received from the driver terminal 10. Based on this voice input data the management server provides extracted sound source information to the driver terminal 10 which is related to the data requested by the driver. The transmitted sound source information is organized into a playlist. In this case, the driver terminal 10 may play the corresponding sound source based on the playlist.

For example, it is assumed that music A1, music A2, and music A3 correlating to singer A, music B1, music B2, and music B3 correlating to singer B, and music C1, music C2, and music C3 correlating to singer C are stored in the sound source storage unit 11 within the driver terminal 10 randomly. In this case, the management server 20 receives and manages the sound source information regarding each piece of music data from the driver terminal 10. In this case, the management server 20 manages only the sound source information and does not store sound source data. Thereafter, when the management server 20 receives a name of singer A as voice input data from the driver terminal 10, the management server 20 creates the playlist configured of music related to singer A, that is, music A1, music A2, and music A3 via voice recognition and provides the created playlist to the driver terminal 10.

As another example, music A1 and music A2 of singer A and music B1 of singer B are stored in a first folder of the sound source storage unit 11 and music A3 of singer A, music B2 of singer B, and music C1 of singer C is stored in a second folder thereof, and music B3 of singer B and music C2 and music C3 of singer C are stored in a third folder thereof. In this case, the management server 20 manages the sound source information related to music A1, music A2, and music B1 as a first group, manages the sound source information related to music A3, music B2, and music C1 as a second group, and the sound source information related to music B3, music C2, and music C3 as a third group.

Thereafter, when the management server 20 receives a name of singer A as voice input data from the driver terminal 10, the management server 20 provides a playlist made up of music A1, music A2, and music A3 to the driver terminal 10. In this case, each piece of music within the playlist is linked via sound source data within the sound source storage unit 11, such that the driver terminal 10 can play music A1, music A2, and music A3 sequentially or randomly.

As another example, when the CD is inserted into the driver terminal 10 and the portable storage device is connected thereto, the driver terminal 10 informs the management server 20 of sources of the sound source information and the management server 20 stores and manages the sound source information for each source.

Meanwhile, the management server 20 may include an interworking unit 42 that is configured to interwork with a sound source server that is managed based on sound source association or singer/artist association. In this case, when the management server 20 receives a portion or the entirety of the sound source from the driver terminal 10, the management server 20 may access the sound source server through the interworking unit 42 and then, acquire the sound source information corresponding to the sound source in question. In this case, the management server 20 assigns and manages IDs to the obtained sound source information.

Here, a portion of the sound source means a quantity of sound source enough to search the same sound source as the corresponding sound source by the management server 20 interworking with the sound source server.

In the exemplary embodiment of the present invention, the sound source information, is, for example, an ID3 tag, includes information as in the following [Table 1]. The sound source information is stored in a sound source within an MP3 file format.

TABLE 1

| Offset | Length | Description |
|---|---|---|
| 0 | 3 | "TAG" Recognition Character String |
| 3 | 30 | Title of Song Character String |
| 33 | 30 | Singer (Musician) Character String |

TABLE 1-continued

| Offset | Length | Description |
|---|---|---|
| 63 | 30 | Album Character String |
| 93 | 4 | Album Release Year Character String |
| 97 | 30 | Remark Character String |
| 127 | 1 | Genre Byte |

Figure 2:
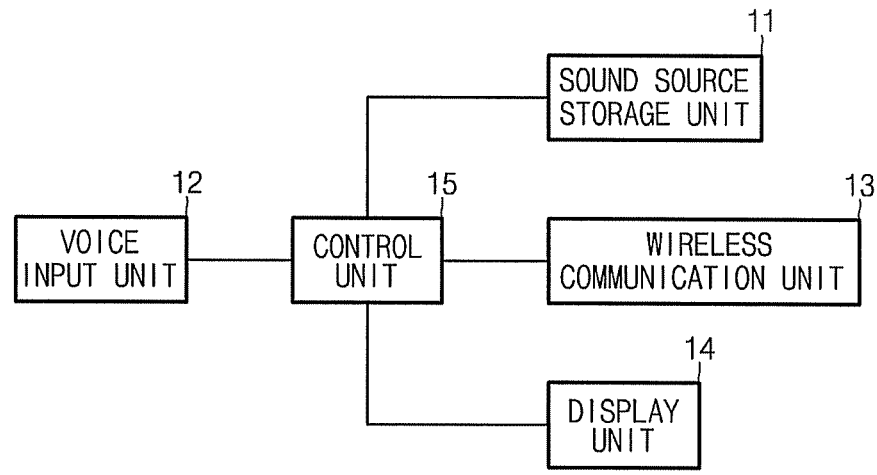
FIG. 2 is a schematic diagram of a driver terminal according to an exemplary embodiment of the present invention.

FIG. 2 is a schematic diagram of the driver terminal according to an exemplary embodiment of the present invention. As shown in FIG. 2, the driver terminal 10 according to the exemplary embodiment of the present invention includes a sound source storage unit 11, a voice input unit 12, a wireless communication unit 13, a display unit 14, and a control unit 15.

Describing each component, the sound source storage unit 11 may be for example a CD or a portable storage device. The sound source storage unit 11 stores a plurality of sound sources each having, for example, sound source information like in the above [Table 1]. The voice input unit 12 receives the voice input data from the driver to create a playlist from the plurality of sound sources based on voice input data from the driver and control via the control unit 15.

The wireless communication unit 13 received and transmits the voice input data input by the driver and from the control unit 15 and receives the playlist corresponding to the voice input data from the management server 20. The wireless communication unit 13 may include at least one module that can implement wireless communication with the management server 20. For example, the wireless communication unit 13 may include a mobile communication module, a wireless Internet module, or the like.

The mobile communication module transmits and receives wireless signals to and from at least one of a base station, external terminals, and a server in a mobile communication network. The wireless signals may include various types of data according to transmission and reception of a voice call signal, a video communication call signal, or a character/multimedia message.

The wireless Internet module is a module for wireless Internet access. An example of the wireless Internet technology may include Wireless LAN (WLAN) (Wi-Fi), Wireless broadband (Wibro), World Interoperability for Microwave Access (Wimax), High Speed Downlink Packet Access (HSDPA), or the like.

The display unit 14 displays the playlist received through the wireless communication unit 13 on a screen according to control of the control unit 15. The display unit 14 may any one of at least a liquid crystal display (LCD), a thin film transistor-liquid crystal display (TFT LCD), an organic light-emitting diode (OLED), a flexible display, a 3D display, and a duplex display differently displaying images according to a viewing direction.

The control unit 15 controls the voice input unit 12 so as to receive the voice input data from the driver once a song selection mode has been activated by the driver, controls the wireless communication unit 13 to transmit the voice input data received by the voice input unit 12 to the management server 20, and controls the display unit 14 to display the playlist transmitted through the wireless communication unit 13 to the control unit 15 on the screen.

In addition, when power is applied to the control unit 15, the control unit 15 transmits the sound source information related the sound source stored in the sound source storage unit 11 to the driver terminal 10 through the wireless communication unit 13. When the sound source unit 11 is a CD, the control unit 15 transmits the sound source information related to the sound source stored in the CD to the driver terminal 10 through the wireless communication unit 13 when the CD is first inserted into the driver terminal 10. In addition, when the sound source unit 11 is the portable storage device, the control unit 15 transmits the sound source information related to the sound source stored in the portable storage device to the driver terminal 10 through the wireless communication unit 13 when the portable storage device is newly connected with the driver terminal 10.

Figure 3:
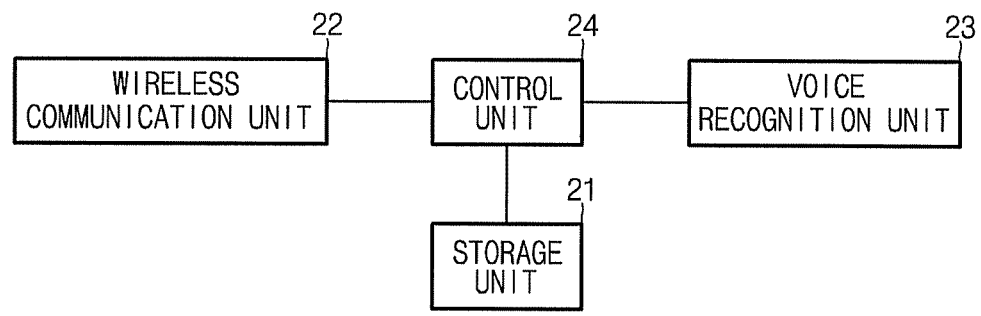
FIG. 3 is a schematic diagram of a management server according to an exemplary embodiment of the present invention.

FIG. 3 is a schematic diagram of a management server according to an exemplary embodiment of the present invention. As shown in FIG. 3, the management server 20 according to the exemplary embodiment of the present invention includes a storage unit 21, a wireless communication unit 22, a voice recognition unit 23, and a control unit 24.

Describing each component, the storage unit 23 stores the sound source information regarding each sound source. The wireless communication unit 22 receives voice input data for selecting a song or a group of songs from the driver terminal. The wireless communication unit 22 transmits a playlist that corresponds to the received voice input data to the driver terminal 10. The voice recognition unit 23 recognizes/interprets the voice input data transmitted through the wireless communication unit 22 according to the control of the control unit 24. This voice recognition technology may be any voice recognition technology, and is understood to be well known by those skilled in the art of voice data recognition.

The control unit 24 controls the voice recognition unit 23 to recognize the voice input data based on the voice input data transmitted from the driver terminal 10 through the wireless communication unit 22, controls the voice recognition unit 23 to extract the corresponding sound source information from the storage unit 21 based on the interpreted results to create a playlist, and controls the wireless communication unit 22 to transmit the created playlist to the driver terminal 10. In addition, the control unit 24 stores the sound source information transmitted from the driver terminal 10 through the wireless communication unit 22 in the storage unit 21.

Figure 4:
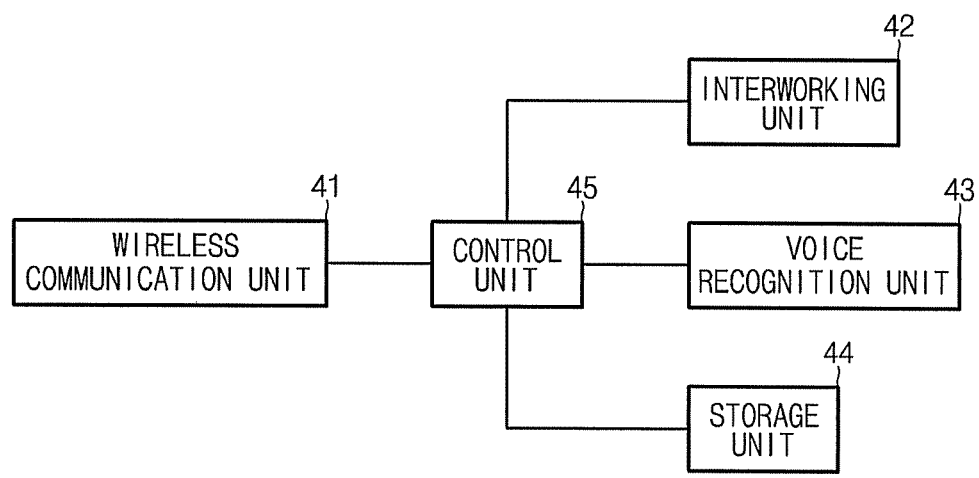
FIG. 4 is a schematic diagram of a management server according to another exemplary embodiment of the present invention.

FIG. 4 is a schematic diagram of a management server according to another exemplary embodiment of the present invention. As shown in FIG. 4, the management server according to the exemplary embodiment of the present invention includes a wireless communication unit 41, an interworking unit 42, a voice recognition unit 43, a storage unit 44, and a control unit 45. Describing each component, the wireless communication unit 41 receives a portion or the entirety of a sound source from the driver terminal 10 and receives voice input data for selecting a song from the driver terminal 10 and transmits the playlist corresponding to the received voice to the driver terminal.

The interworking unit 42 accesses an external sound source server according to the control of the control unit 45 to share a sound source database between the two servers. The voice recognition unit 43 recognizes the voice input data transmitted through the wireless communication unit 41 according to the control of the control unit 45. Again, the voice recognition technology uses a technology known in the art. The storage unit 44 stores the sound source information corresponding to the sound source transmitted through the wireless communication unit 41.

The control unit 45 acquires the sound source information corresponding to the sound source transmitted through the wireless communication unit 41 based on the sound source database included in the external sound source server and stores the acquired sound source information in the storage unit 44. The control unit 45 controls the voice recognition unit 43 to recognize the voice input data transmitted from the driver terminal 10 through the wireless communication unit 41, controls the voice recognition unit 43 to extract the corresponding sound source information from the storage unit 41 based on the recognized results to create the playlist, and controls the wireless communication unit 41 to transmit the created playlist to the driver terminal 10.

Figure 5:
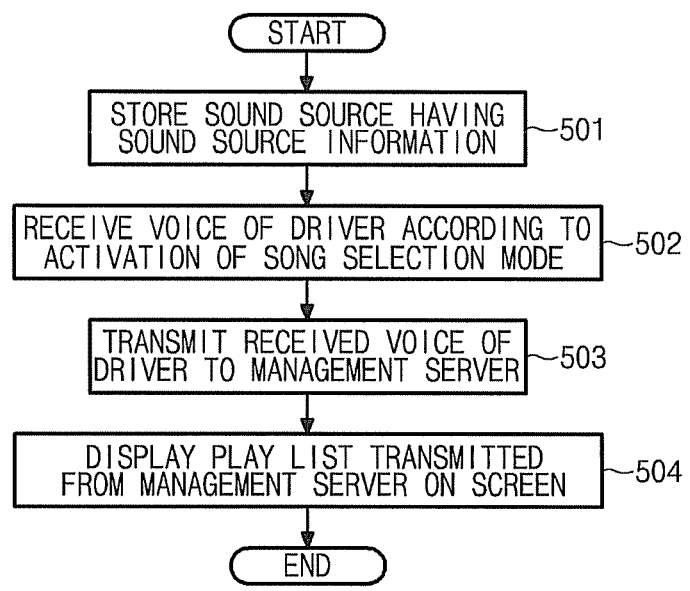
FIG. 5 is a flow chart of a method for providing a sound source information management service in a driver terminal according to an exemplary embodiment of the present invention.

FIG. 5 is a flow chart of a method for providing a sound source information management service in a driver's terminal according to an exemplary embodiment of the present invention. First, the sound source storage unit 11 stores the sound source having the sound source information (501). Next, the voice input unit 12 receives voice input data from the driver once a song selection mode has been activated by the driver (502). Thereafter, the wireless communication unit 13 transmits the voice input data from the driver received through the voice input unit 12 to the management server 20 (503). Thereafter, the display unit 14 displays a playlist transmitted from the management server 20 on a screen within the vehicle (504).

Figure 6:
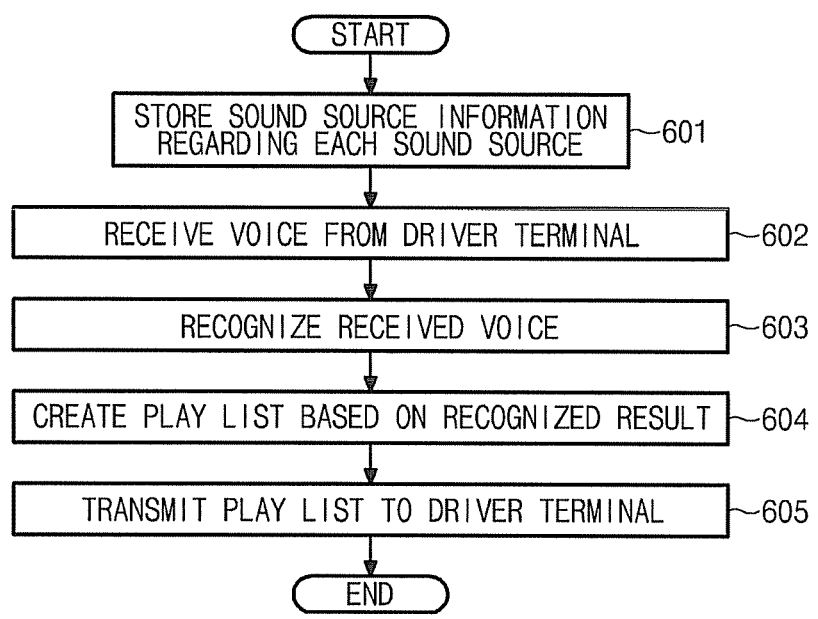
FIG. 6 is a flow chart of a method for providing a sound source information management service in a management server according to an exemplary embodiment of the present invention.

FIG. 6 is a flow chart of a method for providing a sound source information management service in the management server according to the exemplary embodiment of the present invention. First, the storage unit 21 stores the sound source information regarding each sound source (601). Then, the wireless communication unit 22 receives voice input data from the driver terminal (602). Next, the voice recognition unit 23 recognizes the received voice input data according to the control of the control unit 24 (603). The control unit 24 then extracts the corresponding sound source information from the storage unit 21 based on the recognition results of the voice recognition unit 23 to create a playlist (604). The wireless communication unit 22 subsequently transmits the playlist to the driver terminal according to the control of the control unit 24 (605) and the driver terminal displays the playlist on a screen within the vehicle.

Figure 7:
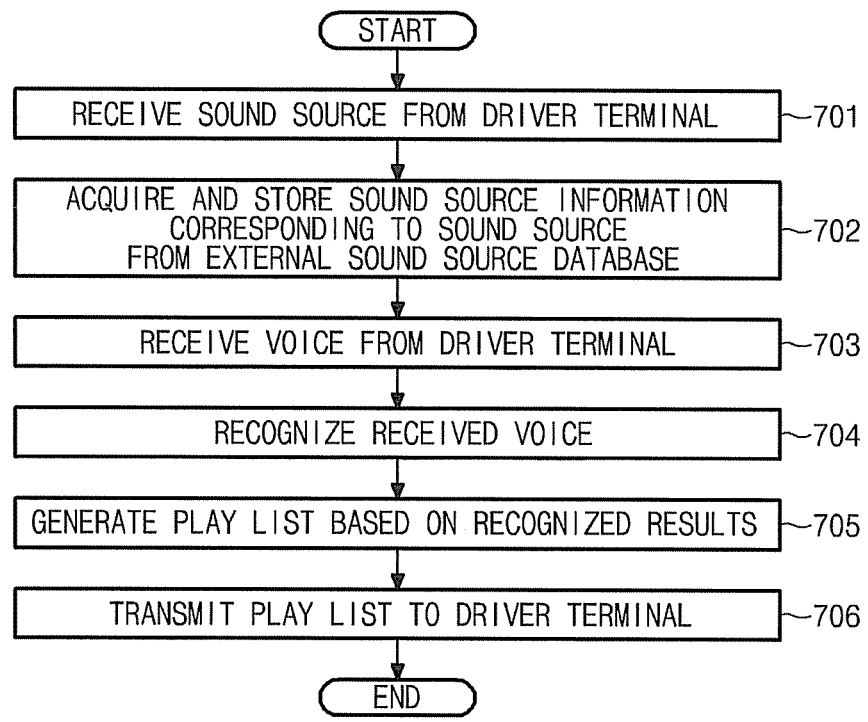
FIG. 7 is a flow chart of a method for providing a sound source information management service in a management server according to another exemplary embodiment of the present invention.

FIG. 7 is a flow chart of a method for providing a sound source information management service in a management server according to another exemplary embodiment of the present invention. First, the wireless communication unit 41 receives a sound source from the driver terminal (701). Thereafter, the control unit 45 acquires the sound source information corresponding to the sound source from the external sound source database through the wireless communication unit 41 and stores the acquired sound source information in the storage unit 41 (702).

Next, the wireless communication unit 41 receives voice input data from the driver terminal (703) and a voice recognition unit 43 recognizes the voice transmitted through the wireless communication unit 41 (704). The control unit 45 then extracts the corresponding sound source information from the storage unit 44 based on the recognition results of the voice recognition unit 43 to create a playlist (705). Next, the wireless communication unit 41 transmits the playlist to the driver terminal according to the control of the control unit 45 (706) and the driver terminal displays the playlist on a screen within the vehicle.

As set forth above, the exemplary embodiments of the present invention allows the driver to listen his/her desired music by managing the sound source information transmitted from the driver terminal, by receiving voice input data from the driver terminal and extracting the sound source information corresponding to the voice input data via voice recognition. Advantageously, the illustrative embodiment of the present invention provides the extracted sound source information to the driver terminal.

Further, the exemplary embodiments of the present invention automatically provide a playlist even for the sound source even for WAV format sound sources by acquiring sound source information for any given sound source on an external server which is in communication with the management server.

While the invention has been shown and described with respect to the preferred embodiments, it will be understood by those skilled in the art that various changes and modifications may be made without departing from the scope of the invention as defined in the following claims.

What is claimed is:

1. A driver terminal of a system for providing a sound source management service, the driver terminal comprising:
    a sound source storage unit configured to store a sound source having sound source information;
    a voice input unit configured to receive voice input data from a driver;
    a wireless communication unit configured to transmit the voice input data to a management server and receiving a playlist corresponding to the voice input data from the management server;
    a display unit configured to display the playlist transmitted to the wireless communication unit on a screen within the vehicle; and
    a control unit configured to activate the voice input unit upon selection of a song selection mode by the driver, control the wireless communication unit to transmit the voice input data to the management server, and control the display unit to display the playlist transmitted through the wireless communication unit on the screen within the vehicle,
    wherein the control unit transmits the sound source information relating to each stored sound source, without transmitting the sound source itself, to the management server when power is applied to the control unit, such that each sound source related to the transmitted sound source information is not stored on the management server.

2. The driver terminal of claim 1, wherein the control unit transmits the sound source information regarding the sound source to the management server when a compact disk (CD) is inserted into the driver terminal when the sound source is stored in the CD.

3. The driver terminal of claim 1, wherein the control unit transmits the sound source information related to the sound source to the management server when a portable storage device is connected with the driver terminal when the sound source is stored in the portable storage device.

4. The driver terminal of claim 1, wherein the sound source information includes at least one of a title of a song, a name of a signer, and an album release year.

5. A management server of a system for providing a sound source information management service, the management server comprising:
    a storage unit configured to store sound source information related to each sound source;
    a wireless communication unit configured to receive, from a driver terminal voice input data, voice input data used to select a group of songs and transmit a playlist corresponding to the received voice input data to the driver terminal;
    a voice recognition unit configured to interpret the voice input data transmitted to the wireless communication unit; and
    a control unit configured to control the voice recognition unit to interpret the voice input data from the driver terminal, extract any corresponding sound source information from the storage unit based on results interpreted by the voice recognition unit to create a playlist, and control the wireless communication unit to transmit the created playlist to the driver terminal,
    wherein the control unit causes the sound source information, which is transmitted from the driver terminal through the wireless communication unit without the sound source itself being transmitted, to be stored in the storage unit, such that each sound source related to the transmitted sound source information is not stored on the management server.

6. A method for providing a sound source information management service in a driver terminal, the method comprising:
    storing, by a sound source storage unit, a sound source having sound source information;
    transmitting, by a wireless communication unit, the sound source information related to each stored sound source, without transmitting the sound source itself, to a management server, such that each sound source related to the transmitted sound source information is not stored on the management server;
    receiving, by a voice input unit, voice input data from a driver in response to a driver activating a song selection mode;
    transmitting, by a wireless communication unit, the received voice input data from the driver to the management server; and
    displaying, by a display unit, a playlist transmitted from the management server on a screen within the vehicle.

7. The method of claim 6, wherein the wireless communication unit transmits the sound source information regarding the sound source to the management server when a compact disk (CD) is inserted into the driver terminal when the sound source is stored in the CD.

8. The method of claim 6, further comprising transmitting, by the wireless communication unit, the sound source information related to the sound source to the management server when a portable storage device is connected with the driver terminal when the sound source is stored in the portable storage device.

9. The method of claim 6, wherein the sound source information includes at least one of a title of a song, a name of a signer, and an album release year.

10. A method for providing a sound source information management service in a management server, the method comprising:
    storing, by a storage unit, sound source information which is transmitted from a driver terminal through a wireless communication unit, without the sound source itself being transmitted, such that each sound source related to the transmitted sound source information is not stored on the management server;
    receiving, by the wireless communication unit, voice input data from a driver terminal;
    interpreting, by a voice recognition unit, the received voice input data;
    extracting, by a control unit, corresponding sound source information from each corresponding sound source based on results interpreted by the voice input data recognition unit to create a playlist; and
    transmitting, by the wireless communication unit, the playlist to the driver terminal.

11. The method of claim 10, wherein the sound source information includes at least one of a title of a song, a name of a signer, and an album release year.

* * * * *